(12) United States Patent
Archambault et al.

(10) Patent No.: US 8,117,604 B2
(45) Date of Patent: Feb. 14, 2012

(54) ARCHITECTURE CLONING FOR POWER PC PROCESSORS

(75) Inventors: Roch G. Archambault, North York (CA); Edwin Chan, Richmond Hill (CA); Raul E. Silvera, Woodbridge (CA)

(73) Assignee: International Business Machines Corporation, Armonk, NY (US)

( * ) Notice: Subject to any disclaimer, the term of this patent is extended or adjusted under 35 U.S.C. 154(b) by 1444 days.

(21) Appl. No.: 11/461,278

(22) Filed: Jul. 31, 2006

(65) Prior Publication Data

US 2008/0028383 A1    Jan. 31, 2008

(51) Int. Cl.
*G06F 9/45* (2006.01)
(52) U.S. Cl. ........................................... 717/147
(58) Field of Classification Search ............ 717/140, 717/145, 105, 133, 156, 9, 154, 146, 147; 395/709
See application file for complete search history.

(56) References Cited

U.S. PATENT DOCUMENTS

| | | | | |
|---|---|---|---|---|
| 5,671,419 | A | * | 9/1997 | Carini et al. ............... 717/145 |
| 5,768,595 | A | * | 6/1998 | Gillies ........................ 717/145 |
| 6,173,444 | B1 | * | 1/2001 | Archambault ............. 717/159 |
| 2003/0005424 | A1 | * | 1/2003 | Ansari et al. ............... 717/154 |
| 2005/0251785 | A1 | | 11/2005 | Vertes et al. |

OTHER PUBLICATIONS

Chan et al, "Architecture Cloning for PowerPC Processors", Toronto Lab, Oct. 17, 2005, pp. 1-20 <CDP05_chan.pdf>.*
Chan et al, "Architecture Cloning for PowerPc Processors", Markham ON L6G 1C7, Canada, Jul. 12, 2005, pp. 1-9 <PowerPC_Chan05.pdf>.*
Cooper et al, "A Methodology for Procedure Cloning", Defense Advanced Research Projects Agency, May 9, 1995, pp. 1-19 (<Methodology_Cooper95.pdf>.*
E. Chan et al.; "Architecture Cloning for PowerPC Processors;" IBM Toronto Lab, Jul. 12, 2005; pp. 1-9.
D. Chen et al.; "Alternative Solutions for Distributed Simulation Cloning;" Simulation, vol. 79, Issue 5-6, May-Jun. 2003; pp. 299-315.

* cited by examiner

*Primary Examiner* — Tuan Anh Vu
(74) *Attorney, Agent, or Firm* — Cantor Colburn LLP; Libby Toub

(57) ABSTRACT

A method for implementing architecture cloning including: constructing a program call graph in a link phase of interprocedural analysis to model calling relationships between one or more procedures in a program; analyzing the program call graph to obtain information about the program; analyzing the program to identify the one or more procedures subject to architecture cloning; determining feasibility of architecture cloning; marking the one or more procedures in the program suitable for architecture cloning; naming the one or more procedures in the program suitable for architecture cloning; inserting a runtime routine call at an entry point of the program; invoking architecture cloning when one or more candidate procedures are identified during procedure cloning; providing a user with an interface for specifying multiple architecture targets to the compiler; and enabling the compiler to generate architectural specific instructions optimized for each of the multiple architecture targets.

6 Claims, 5 Drawing Sheets

ARCHITECTURE CLONING FOR POWER PC PROCESSORS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to architecture cloning, and particularly to a method for providing a user with an interface for specifying multiple architecture targets to the compiler, and enabling the compiler to generate architectural specific instructions optimized for each of the multiple architecture targets.

2. Description of Background

Currently, for a program to achieve compatibility for different PowerPC® processors with IBM® XL compilers, users instruct a compiler to generate instructions that are common to all platforms. One drawback of executing common instructions on all platforms is that underlying hardware features are not being exploited, and therefore the applications might have suboptimal performance on all PowerPC processors.

Considering the limitations of the aforementioned methods, it is clear that there is a need for an efficient method for providing a user with an interface for specifying multiple architecture targets to the compiler.

SUMMARY OF THE INVENTION

The shortcomings of the prior art are overcome and additional advantages are provided through the provision of a method for implementing architecture cloning in an analysis phase and in a transformation phase, the method comprising: constructing a program call graph in the beginning of the link phase of interprocedural analysis to model calling relationships between one or more procedures in a program; analyzing the program call graph via a compiler to obtain information about the program; analyzing the program to identify the one or more procedures subject to architecture cloning; marking the one or more procedures in the program suitable for architecture cloning upon a determination of feasibility of architecture cloning for the one or more procedures in the program; traversing the program call graph from top-down to perform procedure cloning; naming the one or more procedures in the program suitable for architecture cloning; inserting a runtime routine call at an entry point of the program; invoking architecture cloning when one or more candidate procedures are identified during procedure cloning; providing a user with an interface for specifying multiple architecture targets to the compiler; enabling the compiler to generate architectural specific instructions optimized for each of the multiple architecture targets; and executing appropriate instructions at runtime based on a running platform.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution that provides for an efficient method for providing a user with an interface for specifying multiple architecture targets to the compiler, and enabling the compiler to generate architectural specific instructions optimized for each architecture target.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
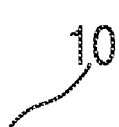
FIG. 1 illustrates one example of a program modified with a runtime check according to the exemplary embodiments of the present invention.

One aspect of the exemplary embodiments is a method for providing a user with an interface for specifying multiple architecture targets to the compiler, and enabling the compiler to generate architectural specific instructions optimized for each architecture target. The compiled program executes the appropriate instructions at runtime depending on the running platform.

Architecture cloning provides users with an interface for specifying multiple architecture targets to the compiler, and enables the compiler to generate architectural specific instructions optimized for each architecture target. The compiled program then executes the appropriate instructions at runtime depending on the running platform. The benefit of this feature is that the resulting binary can take advantage of the latest hardware features in different processors, while still maintaining backward compatibility with older processors, all within a single binary and a single codebase.

IBM XL compilers consist of a sequence of independent components that communicate via a language-independent intermediate representation referred to as Wcode. The language-specific front-end component translates the source code into Wcode, and at high optimization levels, passes the Wcode to the component Toronto Portable Optimizer (TPO). TPO is a language and architecture independent component. TPO consumes the Wcode passed from the front-end and performs a series of interprocedural analysis and optimizations. After TPO applies the transformations, it sends streams of optimized Wcode to the back-end component, where it applies architectural specific optimizations to translate the given Wcode to optimized machine code for different PowerPC platforms.

Architecture cloning is invoked during the IPA phase of compilation. Hence it is placed in the TPO component. Interprocedural analysis in TPO can be described as a two-pass system. The first pass, which is performed at a compile phase, collects summary information for each procedure compiled. The second pass, which is performed during a link phase, uses the collected information to perform interprocedural optimizations on the entire application. TPO also constructs a program call graph during the second pass, which models the calling relationship between procedures in a program. Procedures in the program are represented as nodes, and the possible calls are represented as edges. Many interprocedural optimizations traverse the call graph nodes at the beginning before they perform any transformation. By analyzing the call graph, the compiler can obtain detailed information about the whole program, and thus it can make a better decision when performing interprocedural optimizations on the program.

Architecture cloning is invoked during the second pass of the interprocedural analysis, where the compiler has obtained information about the relationship between procedures. Architecture cloning involves the use of the existing procedure cloning mechanism in TPO, and the properties of procedure cloning influencing the design of architecture cloning.

Cloning techniques involve an interprocedural transformation where the compiler creates specialized copies of procedure bodies, and divides the incoming calls between the original procedure and its copies. Its purpose is to expose more optimization opportunities since the compiler can optimize each cloned procedure copy separately. For example, cloning can enhance the impact of constant propagation by treating parameters that are called with different constant values as constants in different procedure clones. Procedure cloning changes the structure of the call graph, as it introduces a new call graph node for each cloned copy created and a new edge from the original caller to the new call graph node.

During the second pass of IPA, TPO executes a series of interprocedural optimizations in a sequential manner, and it propagates the program transformation performed by an optimization to its subsequent optimization. As a result, introducing a new interprocedural optimization in the second pass might potentially affect the existing optimizations. For architecture cloning, since procedure cloning creates additional call graph nodes, the subsequent interprocedural optimizations are required to process and apply transformation on both the original and the cloned call graph nodes. In order to minimize the total compilation time spent in TPO and the impact of architecture cloning on the existing optimizations, architecture cloning is placed in the late stages of optimizations during second pass, prior to any architectural specific optimizations performed by TPO.

The implementation of architecture cloning is divided into two phases: the analysis phase and the transformation phase. Each phase is also divided in several steps. The following sections describe each step in detail.

Some types of procedures are ineligible to clone due to the limitation of the compiler. Furthermore, excessive procedure cloning can lead to substantial increase in program size. Therefore the first step of architecture cloning is to analyze the entire program and identify the suitable candidates. The analysis first gathers information about the program by traversing the call graph from a bottom-up order. It examines the call graph nodes to obtain information about the procedures, and analyzes the call graph edges to find the calling relationship between procedures. Once information about the procedure is obtained, the analysis then determines the feasibility of cloning the procedure based on the information collected. For example, if the procedure is identified as undefined, which occurs when it is not compiled with TPO during the compile phase, then the procedure is not feasible to clone because it cannot be modified by TPO. The procedure is then not marked as a candidate for architecture cloning.

Architecture cloning also provides the ability for users to instruct the compiler which procedures it should or should not clone. The analysis takes account the above information, and marks the call graph nodes as cloning candidates accordingly. Afterwards, the analysis scans for procedure types that do not reap any performance benefits from applying the architectural specific optimizations. Architecture cloning then avoids marking its respective call graph node as a cloning candidate.

In order to prevent excessive cloning, the analysis further reduces the list of cloning candidates by identifying procedures that are not profitable for architecture cloning. This is performed by examining the execution frequency of the procedure. If a procedure has a low execution frequency, then it is not marked as an architecture-cloning candidate. The execution frequency is available in the call graph nodes and edges, and is determined statically by the program analysis performed prior to architectural cloning.

There are existing mechanisms in the compiler that can help the compiler to calculate the execution frequency of the procedures more accurately. For example, users can specify a list of procedures that they believe have a low execution frequency to help guide the compiler. Furthermore, when the profiled direct feedback (PDF) feature is used to compile the program, this enables the compiler to dynamically determine the execution frequency to produce more accurate information. Hence, the architecture cloning analysis becomes more aggressive with PDF. It sorts the procedures based on their execution frequency, and marks the cloning candidate from the hottest procedure first, until the number of the cloning candidates exceeds a certain threshold.

In order to enable the program compiled with architecture cloning to detect the platform dynamically, a runtime routine call is inserted at the entry point of the program. This runtime routine requests processor information from the system, and the returning value is stored as a global variable. Therefore, the platform detection is performed only once during program execution. The value of the global variable is used in runtime comparison checks for making dispatch decisions. These checks are inserted at the entry points in the program for it to dynamically select which version of the procedure to be executed. FIG. 1 is an example of a program 10 modified with the runtime checks.

After all the cloning candidates have been marked in the call graph, architecture cloning then traverses the call graph from top down to perform procedure cloning. When it reaches a call graph node that is a cloning candidate, then for each of the architectural targets passed by the user, it invokes the procedure cloning mechanism, which re-maps the parameters and duplicates the body of the procedure, thus resulting in a cloned copy for each of the multiple architecture targets.

There are a few modifications to a procedure cloning mechanism that are implemented for architecture cloning. First, the cloned procedure name is appended with the target architecture. In addition, any built-in function calls in the procedure are also renamed to call the architectural specific version if available in the cloned procedure. Procedure cloning also modifies the call graph by creating new nodes and edges for the cloned procedures. First, it checks whether the candidate call graph node is the entry point of the program. If the node is indeed the entry point, then it creates a new edge from the original node to the newly created clone node. In addition, a runtime check for making the dispatch decision is placed at the beginning of the original procedure. Afterwards, it checks to see if any callers of the original procedure are cloning candidates. It then identifies the predecessor edges of the original procedure from its cloned callers, and updates them so that they are now directed to the cloned procedure.

Figure 2:
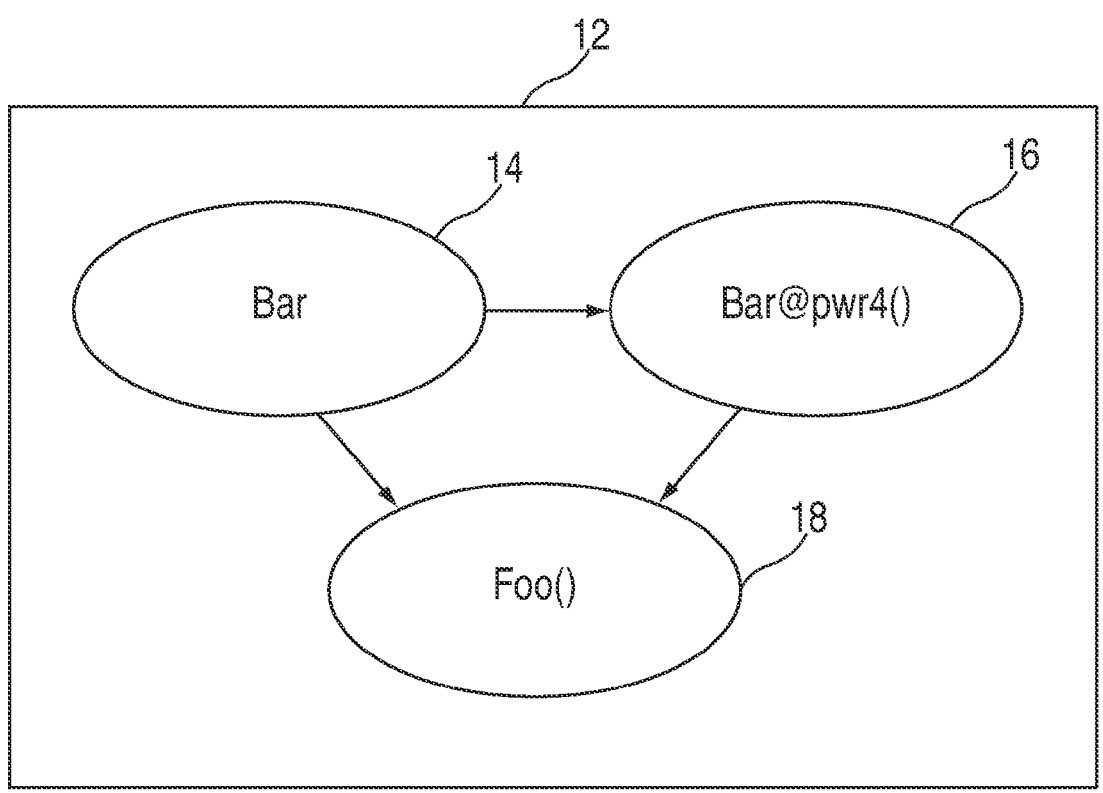
FIG. 2 illustrates one example of a call graph prior to cloning a Foo( ) procedure, where a caller Bar( ) has been cloned with procedure Bar@pwr4( ) according to the exemplary embodiments of the present invention.

FIG. 2 illustrates the call graph 12 before cloning the procedure Foo( ), where its caller Bar( ) has been cloned with the procedure Bar@pwr4( ). Call graph 12 includes a caller Bar 14, a procedure Bar@pwr4( ) 16, and a procedure Foo( ) 18.

Figure 3:
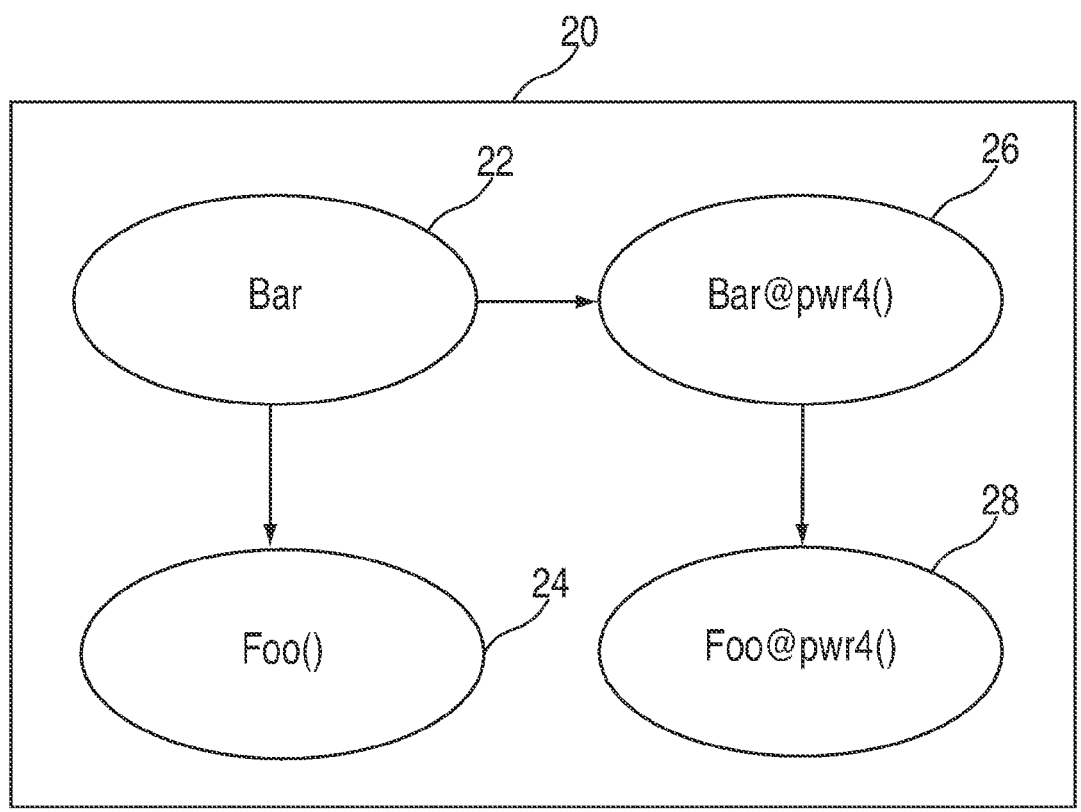
FIG. 3 illustrates one example of a call graph after the Foo( ) procedure has been cloned according to the exemplary embodiments of the present invention.

FIG. 3 illustrates the call graph 20 after the procedure Foo( ) has been cloned. Call graph 20 includes a caller Bar 22, a procedure Foo( ) 24, a procedure Bar@pwr4( ) 26, and a procedure Foo@pwr4( ) 28. The edge from procedure Bar@pwr4( ) 26 is updated to direct the new cloned procedure Foo@pwr4( ) 28.

The change in the call graph 20 allows the cloned procedure Bar@pwr4( ) 26 to invoke procedure Foo@pwr4( ) 28 directly, rather than calling the original procedure Foo( ) 24 first. In essence, the cloned procedures are grouped together and treated like a sub-graph. This is beneficial in the case where all the callers of the procedure Foo( ) 24 are cloning candidates. Since it is guaranteed that the check was performed prior to invoking the procedure Foo( ) 24, it becomes unnecessary to place the runtime check for making the dispatch decision in the procedure Foo( ) 24. In the case where not all of the callers of the original procedure are cloning candidates, then the dispatch decision is made within the original procedure. Thus, a runtime check is inserted in the original procedure and is modified to include the runtime check. Also, a new edge is inserted in the call graph from the original procedure to the cloned procedure.

Figure 4:
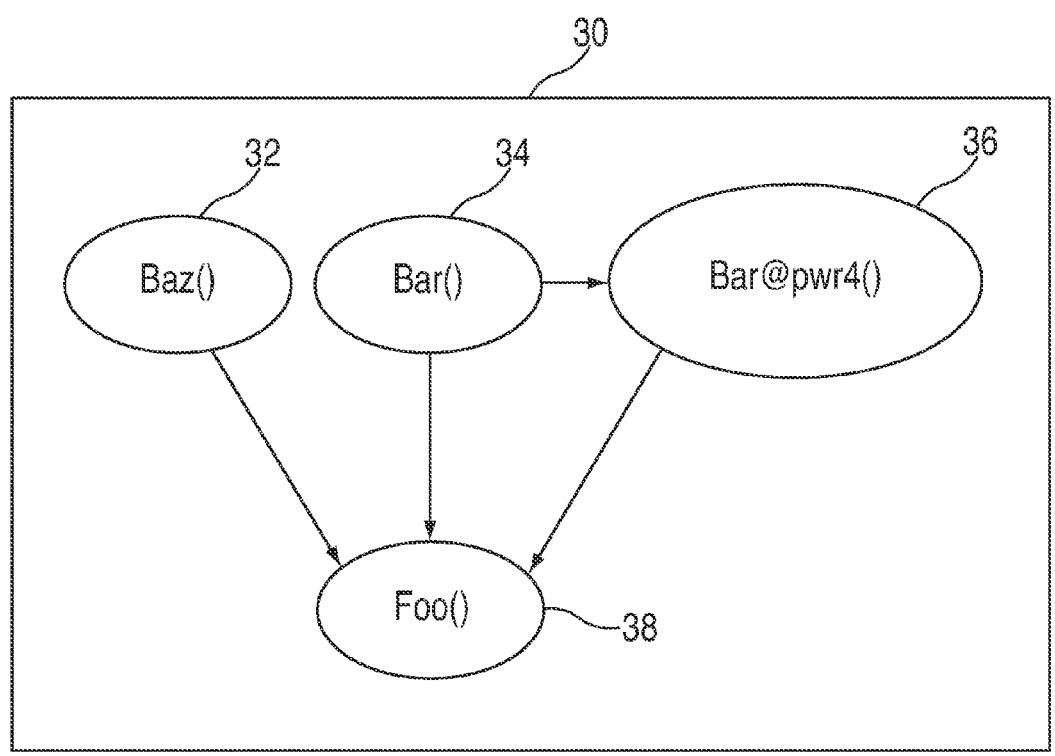
FIG. 4 illustrates one example of a call graph where a caller is not a cloning candidate according to the exemplary embodiments of the present invention.

FIG. 4 illustrates a call graph 30, where one of its caller Baz( ) 32 is not a cloning candidate. Call graph 30 includes a caller Baz( ) 32, a caller Bar( ) 34, a procedure Bar@pwr4( ) 36, and a procedure Foo( ) 38. Once the cloned call graph node for the original procedure is created, it first updates the edges from the cloned callers as described previously. Therefore, an edge is updated from Bar@pwr4( ) 36 to Foo@pwr4( ) 28 of FIG. 3. Then a new edge is inserted from Foo( ) 38 to Foo@pwr4( ) 28 of FIG. 3, and the runtime check at the beginning of Foo( ) 38.

Figure 5:
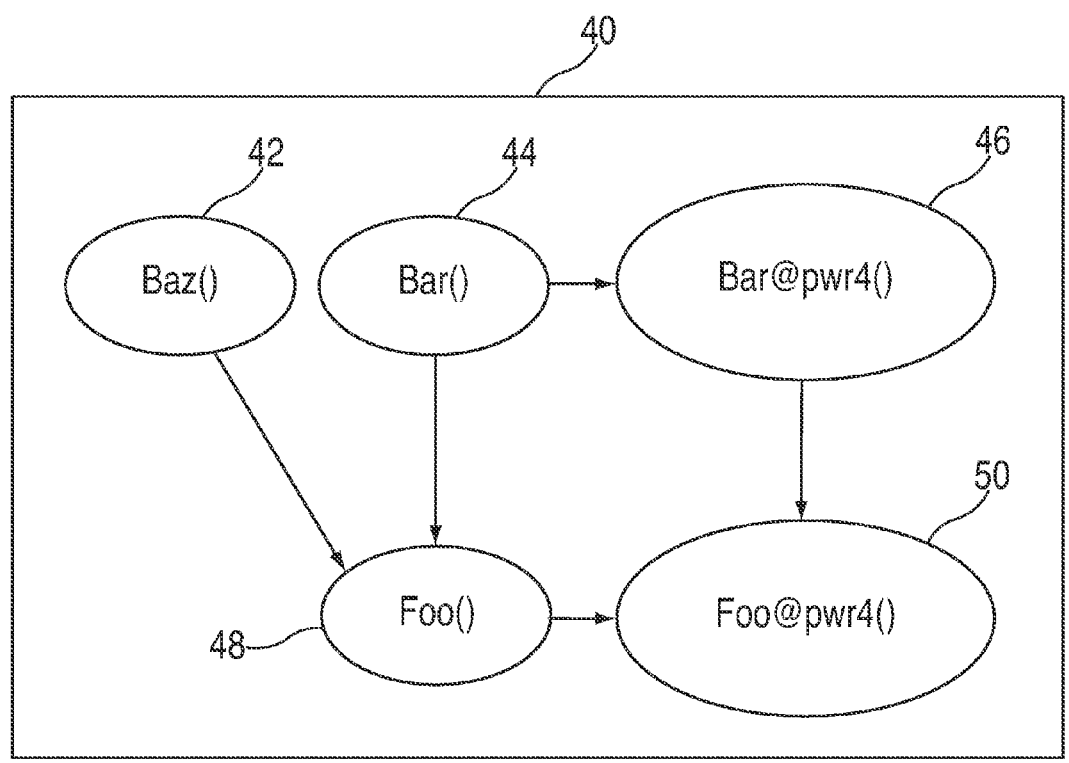
FIG. 5 illustrates one example of a call graph after a transformation, with a new edge from the Foo( ) procedure to the procedure Foo@pwr4( ) according to the exemplary embodiments of the present invention.

FIG. 5 illustrates the resulting call graph 40 after the transformation. Call graph 40 includes a caller Baz( ) 42, a caller Bar( ) 44, a procedure Bar@pwr4( ) 46, a procedure Foo( ) 48, and a procedure Foo@pwr4( ) 50. After all the candidates are cloned, architecture cloning groups the cloned procedures for each architecture target into a separate unit referred to as "compilation unit". The unit is initialized with the appropriate architecture settings, so that TPO can apply architectural specific optimizations only on the procedures in the unit. More importantly, this enables TPO to send Wcode streams with different architecture settings to the backend, so that the backend can generate architectural specific instructions and schedule them for a particular platform.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing architecture cloning for a program, the method comprising:

receiving, at an initial analysis stage within a compiler, a program written in a platform neutral format, the program being reconfigurable to operate in a plurality of architecture targets;

the initial analysis stage including:

constructing in the compiler a program call graph in a beginning of a link phase of interprocedural analysis to model calling relationships between one or more procedures in the program;

analyzing the program call graph via the compiler to obtain information about the program;

analyzing the program to identify the one or more procedures subject to architecture cloning;

using information obtained in the initial analysis stage to invoke an architecture cloning stage, the architecture cloning stage including:

marking the one or more procedures in the program suitable for architecture cloning upon a determination of feasibility of architecture cloning for the one or more procedures in the program;

traversing the program call graph from top-down to perform procedure cloning;

naming the one or more procedures in the program suitable for architecture cloning, the cloning including re-mapping parameters of a candidate procedure according to the target architecture, and duplicating the body of the procedure;

invoking architecture cloning when one or more candidate procedures are identified during procedure cloning;

inserting a runtime routine call in the program at an entry point of the program, such that that the routine when executed within the compiled program will cause the compiled program to detect an architecture of a system the compiled program is being run on, the type of the detected architecture being stored in a global variable;

generating with the compiler the compiled program that includes architectural specific instructions optimized for each of the multiple architecture targets, all of the architectural specific instructions for all of the multiple architecture targets being included in a single binary;

providing the compiled program to the system;

determining the architecture of the system based on the global variable; and selecting appropriate architectural specific instructions from the single binary to execute based on the architecture of the system.

2. The method of claim 1, wherein the user is permitted to select the one or more procedures of the program for architecture cloning.

3. The method of claim 1, wherein an analysis scan is performed in the analysis phase for detecting the one or more procedures that do not reap performance benefits of applying architecture cloning.

4. The method of claim 3, further comprising reducing a list of the one or more candidate procedures by identifying candidate procedures that are not profitable for architecture cloning by examining an execution frequency of the one or more candidate procedures.

5. The method of claim 4, wherein the user is permitted to specify a list of the one or more procedures that have a low execution frequency.

6. The method of claim 1, wherein built-in function calls in the one or more procedures in the program are renamed to call the architectural specific instructions.

* * * * *